(12) United States Patent
Coello et al.

(10) Patent No.: US 8,377,186 B1
(45) Date of Patent: Feb. 19, 2013

(54) TEMPORARY AQUEOUS AEROSOL PAINT COMPOSITION AND A METHOD FOR PREPARING THE COMPOSITION

(75) Inventors: Arthur Coello, Miami, FL (US); Carlos Vega Velazquez, Jalisco (MX)

(73) Assignee: EZ Paint, Inc., Hialeah, FL (US)

( * ) Notice: Subject to any disclaimer, the term of this patent is extended or adjusted under 35 U.S.C. 154(b) by 0 days.

(21) Appl. No.: 13/100,115

(22) Filed: May 3, 2011

Related U.S. Application Data

(60) Continuation-in-part of application No. 12/455,395, filed on Jun. 1, 2009, now Pat. No. 7,935,183, which is a continuation-in-part of application No. 11/601,254, filed on Nov. 17, 2006, now Pat. No. 7,540,907, which is a division of application No. 10/672,425, filed on Sep. 26, 2003, now Pat. No. 7,220,299.

(51) Int. Cl.
*C09D 131/04* (2006.01)
*C09K 3/30* (2006.01)

(52) U.S. Cl. ............... 106/31.01; 106/31.04; 106/31.05; 524/903; 524/557

(58) Field of Classification Search ............... 106/31.01, 106/31.04, 31.05; 524/557, 903
See application file for complete search history.

(56) References Cited

U.S. PATENT DOCUMENTS

| | | | | |
|---|---|---|---|---|
| 4,450,253 A | * | 5/1984 | Suk | 524/378 |
| 5,250,599 A | * | 10/1993 | Swartz | 524/366 |
| 5,451,627 A | * | 9/1995 | Jamasbi | 524/389 |

* cited by examiner

*Primary Examiner* — Kelechi Egwim
(74) *Attorney, Agent, or Firm* — Malloy & Malloy, P.L.

(57) ABSTRACT

A temporary aqueous aerosol paint composition comprising an aqueous paint component, including an aqueous solvent, and an aqueous propellant component. At least one embodiment of the composition includes an amount of water as the aqueous solvent. The composition is formulated to minimize and/or eliminate the hazards presented by various volatile and non-volatile organic compounds present in known aerosol paint compositions, by eliminating or minimizing inclusion of such organic compounds. Further, the composition is developed to facilitate enhanced degradation in a short period of time, while also including elements to increase the performance when in use. A variety of pigment compounds may be used in the composition, permitting a variety of applications. The present invention is also directed to a method for preparing the temporary aqueous aerosol paint composition. This method includes adding the compounds to a reaction vessel and mixing thoroughly via a plurality of addition steps and mixing cycles.

11 Claims, No Drawings

TEMPORARY AQUEOUS AEROSOL PAINT COMPOSITION AND A METHOD FOR PREPARING THE COMPOSITION

CLAIM OF PRIORITY

The present application is a continuation-in-part patent application of previously filed and currently having U.S. patent application Ser. No. 12/455,395 and a filing date of Jun. 1, 2009 now U.S. Pat. No. 7,935,183, which is a continuation-in-part patent application of having U.S. patent application Ser. No. 11/601,254 and a filing date of Nov. 17, 2006, now U.S. Pat. No. 7,540,907, which is a divisional patent application of having U.S. patent application Ser. No. 10/672,425 and a filing date of Sep. 26, 2003, now U.S. Pat. No. 7,220,299, each of which is incorporated herein by reference in its entirety.

BACKGROUND OF THE INVENTION

1. Field of the Invention

The present invention is directed to a temporary aqueous aerosol paint composition and a method for preparation of the same. In particular, the aqueous aerosol paint composition of the present invention may be utilized in temporary marking applications such as, for example, marking the location of underground utility lines, as is common in the construction industry.

2. Description of the Related Art

Aerosol paints are utilized in a variety of applications, including those typically associated with standard (i.e., non-aerosol) oil or water based paints. This is a result of the numerous advantages of an aerosol delivery system. For example, the application of an aerosol paint often requires less skill than is typically required to properly apply a standard oil or water based paint. In addition, the use of an aerosol paint eliminates the need for cleaning paint brushes, paint rollers, paint trays, etc., as is required after the application of standard paints. Also, in certain instances, aerosol paint may be readily applied to surfaces which may be awkward and/or difficult to access, thereby hindering the application of standard paints.

Due to the numerous advantages of aerosol paints, their use has become widespread for both home and commercial applications. One particular area of widespread commercial usage of aerosol paints is in the construction industry, and in particular, the non-permanent identification of various structures and/or materials on or around a construction site, for example, site boundaries and/or locations specified by a surveyor, identification of the location of underground utility lines and/or other underground structures, identification of building materials, etc.

Historically, the aerosol paints utilized in the construction industry and, in fact, aerosol paints in general, comprise a mixture of volatile organic solvents, as well as, typically, an equally volatile aerosol propellant. While this combination of volatile compounds results in a stable and usable aerosol paint composition, the hazardous aspects of such volatile compounds are now all too well known. To begin, such compositions are typically flammable, due to the concentration of highly volatile compounds, and as such, these compositions are dangerous to store, transport, and handle, and the potential of a fire, or worse, an explosion, due to mishandling is a constant concern. In addition, it is also now well documented that exposure to such volatile organic compounds, even in limited amounts, presents a health hazard to the persons who are exposed to them. This exposure hazard exists for persons who are directly applying such volatile compositions as well as those who may simply be present in the general vicinity in which they are being applied. Aside from the potential fire, explosion, and health hazards presented by such volatile aerosol paint compositions, such compositions are also believed to be a factor in the further depletion of the ozone layer and thus, they are believed to contribute to the phenomenon now commonly known as "global warming," which, if left uncontrolled, is believed to pose a potentially devastating threat to the very existence of our planet.

Attempts to address the negative aspects of such volatile aerosol paint compositions, as outlined above, have resulted in the development of formulations which reduce and/or eliminate the reliance on volatile compounds in aerosol paint compositions, with varying degrees of success. For instance, although a number of aerosol paint compositions have been formulated which no longer require a volatile organic solvent, many of these formulations still utilize a volatile organic propellant, thereby still presenting the hazards presented above, albeit to a somewhat lesser degree. In addition, these formulations are reportedly prone to foaming problems upon application, due to entrapment of the volatile organic propellant in the non-volatile paint component. Also, many of these formulations are known to be unstable even after only a short period of time.

Further attempts to improve aerosol paint formulations include the use of essentially non-volatile compounds in both the paint component and the propellant component, however, many of these formulations still reportedly exhibit excessive foaming so as to limit their widespread commercial usage. In addition, these later formulations still typically contain other harmful organic compounds and, as such, they continue to present a health hazard to persons who directly apply them or are otherwise exposed to them.

In addition, the currently known and purportedly "temporary" aerosol marking paints utilized in the construction industry today are formulated such that they typically remain visible from between several months to and more than a year after application, depending upon the type of surface or material on which they are applied, and the climatic conditions in the region of application. Aside from the obvious eyesore such lingering markings present, a more serious issue is the safety hazard created due to potential confusion in determining exactly what the various and often overlapping markings are supposed to indicate. As should be appreciated, the potential of a construction crew digging or drilling in an area where underground gas, electric, water, and/or sewer lines are not clearly identified presents a serious risk to the health and well being of the crew, as well as the persons in the immediate and surrounding areas. In some instances, a temporary aerosol marking paint may be desired for use on non-horizontal surfaces. As such, it would be beneficial to develop a formulation to reduce running or dripping of the paint composition while drying or curing on a surface.

As such, it would be beneficial to provide an aerosol paint composition which minimizes and/or eliminates the negative attributes identified above, yet is formulated for ease of handling and consistency of application. More in particular, such an aerosol paint composition would preferably comprise an aqueous paint component, including an aqueous solvent, as well as an aqueous propellant component. It would be further beneficial for such an aqueous aerosol paint composition to comprise compounds which minimize and/or eliminate the hazards presented to users and the environment relative to the various volatile and non-volatile organic compounds typically included in aerosol paint compositions, as discussed above. Preferably, any such aqueous aerosol paint composition would be formulated to provide a highly visible marking in a variety of fluorescent colors such that various structures and/or materials on or around a construction site may be clearly marked so as to eliminate confusion. Yet another benefit would be for such an aqueous aerosol paint composition to naturally and essentially completely degrade within weeks rather than months of application. A further advantage would be achieved by providing a simple and cost effective method for preparing and packaging such a temporary aqueous aerosol paint composition to permit widespread usage within the construction industry and elsewhere.

SUMMARY OF THE INVENTION

The present invention is directed to a temporary and completely aqueous aerosol paint composition for use in any temporary marking application such as, by way of example only, marking the location of buried utility lines or other structures and/or materials, as is common in the construction industry. More in particular, the inventive composition of the present invention comprises an aqueous paint component and an aqueous propellant component.

To begin, the aqueous paint component of the present invention comprises an aqueous solvent. The aqueous solvent may comprise between generally about 50% to 90% by weight of the aqueous paint component. In one embodiment, the aqueous solvent comprises an amount of water. In one further embodiment, the aqueous solvent comprises an amount of filtered water which has been filtered specifically to remove chlorine and/or iron and/or ions thereof.

The aqueous paint component of the present invention also includes a polymeric resin, which may comprise between generally about 5% to 10% by weight of the aqueous paint component. In another embodiment, the polymeric resin may comprise between generally about 2.5% to 10% by weight of the aqueous paint component. In at least one embodiment, the polymeric resin comprises a polymeric compound dispersion and, in at least one further embodiment, the polymeric resin comprises a polyvinyl acetate dispersion.

Additionally, the composition of the present invention includes at least one pigment compound, and in at least one embodiment, a colored pigment compound. Another embodiment of the present invention comprises a fluorescent colored pigment compound. At least one other embodiment comprises a plurality of colored pigment compounds, while yet another embodiment comprises a white pigment compound. In one embodiment, the aqueous paint component of the present invention includes at least one pigment compound in an amount between generally about 5% to 25% by weight. In another embodiment, the at least one pigment compound may comprise an amount between generally about 4% to 25% by weight.

Also, the aqueous paint component comprises at least one filler compound. Similar to the pigment compounds, however, at least one embodiment of the aqueous paint component comprises a plurality of filler compounds. One embodiment of the present invention includes the at least one filler compound in an amount between generally about 1% to 10% by weight of the aqueous paint component.

The aqueous paint component of the present invention may also comprise a number of additional compounds including, but not limited to, an anti-foaming agent, a dispersant, a surfactant, a bactericide, and/or a light stabilizer. For example, at least one embodiment the aqueous paint component includes an anti-foaming agent which may comprise between generally about 0.10% to 0.50% by weight of the aqueous paint component. In another embodiment, an anti-foaming agent may comprise generally about 0.10% to 1% by weight of the aqueous paint component. At least one other embodiment of the aqueous paint component includes a dispersant comprising between generally about 0.10% to 1.00% by weight, and yet one other embodiment may include a surfactant comprising an amount between generally about 0.05% to 1.00% by weight, while still another embodiment includes a bactericide which may comprise between generally about 0.01% to 0.10% by weight of the aqueous paint component.

In the embodiments of the present invention comprising at least one fluorescent colored pigment compound, the aqueous paint component may also include an amount of a light stabilizer. In one embodiment, the present invention includes a light stabilizer comprising in an amount of up to about 0.6% by weight of the aqueous paint component. In another embodiment, a light stabilizer comprises an amount in a range of about 0.20% to 0.25% by weight of the aqueous paint component. In at least one further embodiment, however, the aqueous paint component does not comprise any amount of a light stabilizer.

The present invention also comprises a method for preparing a temporary aqueous aerosol paint composition, in accordance with the composition presented above. The method of the present invention comprises charging a reaction vessel with an initial amount of an aqueous solvent which, as indicated above, comprises water in at least one embodiment. The method of the present invention also includes setting a primary mixing cycle for the contents of the reaction vessel. More in particular, setting the primary mixing cycle includes adjusting the mixing speed to a predetermined primary mixing speed, which may be expressed in revolutions per minute (rpm) of the mixing blade, and maintaining this predetermined primary mixing speed for a predetermined primary mixing time.

Additionally, the method of the present invention comprises adding at least one pigment compound to the reaction vessel, however, at least one embodiment includes adding a plurality of pigment compounds to the reaction vessel. The method also includes adding an additional amount of the aqueous solvent to the reaction vessel, and setting a high velocity mixing cycle for the contents of the reaction vessel (i.e., adjusting and maintaining the mixing speed at a predetermined high velocity mixing speed for a predetermined high velocity mixing time).

The method of the present invention also includes adding at least one filler compound to the reaction vessel. In at least one embodiment, the method of the present invention comprises adding a plurality of filler compounds to the reaction vessel. The method also includes setting a first low velocity mixing cycle for the contents of the reaction vessel, which is set in a similar manner to that described above with respect to the primary and high velocity mixing cycles.

One preferred embodiment of the method of the present invention further comprises adding a polymeric resin to the reaction vessel, and setting a second low velocity mixing cycle for the contents of the reaction vessel, once again, in a similar manner to that described above with respect to the primary and high velocity mixing cycles. In addition, the method of the present invention includes adding a final amount of the aqueous solvent to the reaction vessel.

It is understood to be within the scope of the method of the present invention to comprise adding one or more additional compounds to the reaction vessel including, by way of example only, an anti-foaming agent, a dispersant, a surfactant, a bactericide and/or a light stabilizer.

These and other objects, features and advantages of the present invention will become more clear as the detailed description are taken into consideration.

DETAILED DESCRIPTION OF THE PREFERRED EMBODIMENT

While this invention is susceptible of embodiment in many different forms, there is described in detail herein at least one specific embodiment, with the understanding that the present disclosure is to be considered as an exemplification of the principles of the invention and is not intended to limit the invention to this one specific embodiment.

As previously indicated, the present invention is directed to a temporary aqueous aerosol paint composition and a method for preparing the inventive composition. More in particular, the present invention is directed to an aqueous aerosol paint composition which may be utilized for temporary marking of a variety of items. At least one embodiment of the composition of the present invention may be utilized to temporarily, yet positively, identify a variety of structures and/or materials on or around a construction site including, by way of example only, site boundaries and/or locations specified by a surveyor, locations of underground utility lines and/or other underground structures, various building materials, etc.

The temporary aqueous aerosol paint composition of the present invention comprises an aqueous paint component as well as an aqueous propellant component. The temporary aqueous paint component may comprise between generally about 60% to 80% by weight of the inventive composition, while the aqueous propellant component comprises between generally about 20% to 40% by weight of the aqueous aerosol paint composition.

The aqueous aerosol paint component of the present invention comprises an aqueous solvent, the aqueous solvent comprising between generally about 50% to 90% by weight of the aqueous paint component. In one embodiment, the aqueous solvent comprises between generally about 70% to 85% by weight of the aqueous paint component, while in one other embodiment, the aqueous solvent comprises between generally about 60% to 65% by weight.

In at least one embodiment of the present invention the aqueous solvent may comprise an amount of water, however, it is understood that other aqueous solvents may be utilized and that compositions comprising such other aqueous solvents are also included within the scope and intent of the present invention. In one preferred embodiment, the aqueous solvent of the present invention comprises an amount of filtered water and, more specifically, an amount of filtered water which has been filtered to remove chlorine and/or iron and/or ions thereof.

In addition to the aqueous solvent, the aqueous aerosol paint component of the present invention comprises a polymeric resin. Such polymeric resins are typically provided as a carrier for one or more paint pigment compounds and, more importantly, as a film forming agent which acts as an adhesive interface between the pigment compounds and a surface on which the paint composition is applied. In the present inventive composition, the polymeric resin may comprise a polymeric compound dispersion and, in particular, an aqueous polymeric compound dispersion. In one preferred embodiment, the polymeric compound dispersion comprises a short chain polymer, such as polyvinyl acetate, so as to facilitate the inhibition of unwanted interaction between the polymeric resin with the other compounds of the aqueous paint component of the present invention. More in particular, the polyvinyl acetate dispersion of one preferred embodiment of the present invention comprises an aqueous dispersion of a short chain homopolymer of vinyl acetate without a plasticizer, such as Mowilith D-50, a polyvinyl acetate dispersion manufactured by Clariant Mexico, S.A. de C.V.

The aqueous paint component of the inventive composition of the present invention comprises the polymeric resin in an amount of between generally about 5% to 10% by weight of the aqueous paint component and, in one preferred embodiment of the present invention, the aqueous paint component comprises generally about 6% by weight of a polyvinyl acetate dispersion. In another embodiment, the polymeric resin comprises an amount between generally about 2.5% to 10% by weight of the aqueous paint component. In a further embodiment, the aqueous paint component comprises between generally about 4.0% and 4.5% by weight of a polyvinyl acetate dispersion.

Also as indicated above, the aqueous paint component of the present invention further comprises at least one pigment compound. The at least one pigment compound is structured to at least partially define a color of the temporary aerosol paint composition, and more in particular, a color of the composition after applying to a surface and curing. In one preferred embodiment, the at least one paint pigment compound is structured to at least partially define a fluorescent color, while in at least one other preferred embodiment, the at least one pigment compound is structured to at least partially define a white color, and in yet one further embodiment, the at least one pigment compound is structured to at least partially define a black color, for example, a pigment compound comprising carbon black. A further preferred embodiment of the present invention comprises an aqueous paint component having a plurality of pigment compounds to at least partially define a color of the temporary aerosol paint composition.

One preferred embodiment of the present invention comprises a benzoguanamine/formaldehyde condensate with organic dyes, such as one of the Fiesta Daylight Fluorescent Colours, manufactured by Swada (Limited) London, as the at least one pigment compound. These pigment compounds may be utilized to at least partially define such fluorescent colors as pink, red, orange, green, blue, and yellow, just to name a few. At least one embodiment of the present invention comprises one of the fluorescent pigments comprising a formaldehyde-melamine-p-toluenesulfonamide copolymer, such as is manufactured by the Sinloihi Co. Ltd. of Japan.

Alternatively, the aqueous paint component of the present invention may comprise at least one white pigment compound comprising titanium dioxide such as, by way of example only, Tronox CR-828, as manufactured by the Kerr-McGee Chemical Corporation.

The at least one pigment compound of the aqueous component of the present invention comprises between generally about 5% to 25% by weight. Tables I through VII below contain exemplary formulations of the inventive composition of the present invention for a number of color variations, including generally the amount of specific pigment compounds in each.

The aqueous paint component of the present invention further comprises at least one filler compound, however, one preferred embodiment comprises a plurality of filler compounds. In one embodiment, the at least one filler compound of the aqueous paint component comprises an aluminum silicate compound. Aluminum silicate compounds including, but not limited to, kaolin or kaolinite have been included in paint compositions to enhance viscosity, i.e., to increase the viscosity of the paint composition, so as to limit running upon application to a surface. In at least one other embodiment, the at least one filler compound comprises a calcium carbonate compound. Such calcium carbonate compounds have been utilized in paint formulations to limit adsorption by porous surfaces such as may be encountered, for example, when marking the location of underground utility lines and/or other underground structures on overlying concrete, asphalt, gravel, grass, and/or dirt. As indicated above, however, one preferred embodiment of the present invention comprises a plurality of filler compounds such as, for example, an aluminum silicate compound and a calcium carbonate compound.

At least one embodiment of the aqueous paint component of the present invention comprises the at least one filler compound in an amount of between generally about 1% to 10% by weight. In one preferred embodiment, the aqueous paint component of the present invention comprises a plurality of filler compounds each in an amount of between generally about 1% to 10% by weight. More in particular, one preferred embodiment of the aqueous paint component comprises an aluminum silicate compound in an amount of generally about 1.7% by weight and a calcium carbonate compound in an amount of generally about 2.1% by weight. One other preferred embodiment of the aqueous paint component of the present invention comprises an aluminum silicate compound in an amount of generally about 5.1% by weight and a calcium carbonate compound in an amount of generally about 6.4% by weight. Once again, Tables I through VII below contain exemplary formulations of the inventive composition of the present invention for a number of color variations, including generally the amount of specific filler compounds in each.

One further embodiment of the aqueous paint component of the present invention comprises a dispersant. In particular, the aqueous paint component may comprise a dispersant structured to balance the ionic forces between the various compounds comprising the aqueous paint component, so as to enhance the stability of these compounds in an aqueous medium. The aqueous paint component of the present invention comprises the dispersant in an amount of between generally about 0.10% to 1.00% by weight. More specifically, one preferred embodiment of the aqueous paint component comprises the dispersant in an amount of generally about 0.5% by weight, while one other preferred embodiment comprises generally about 0.25% by weight. In one preferred embodiment, the dispersant comprises a non-ionic surfactant such as, by way of example only, Crisanol NF-100, manufactured by Christianson S.A. de C.V., or a mixture of Brimopol S 904 and Brimopol S 9010, each manufactured by Polaquimia, S.A. de C.V.

The aqueous paint component of the present invention may also comprise an anti-foaming agent. In particular, at least one embodiment of the aqueous paint component of the present invention comprises between generally about 0.10% and 0.50% by weight of an anti-foaming agent. Another embodiment comprises between generally about 0.10% to 1.0% by weight of an anti-foaming agent. The anti-foaming agent is included in the aqueous paint component to facilitate the release of the minimal amount of volatile compounds present in the aqueous paint component during application and cure, so as to minimize irregularities in the surface of the cured paint film due to the release of such volatile compounds. One preferred embodiment comprises between generally about 0.20% and 0.25% by weight of an anti-foaming agent in the aqueous paint component, whereas another embodiment comprises between generally about 0.70% to 0.75% by weight of an anti-foaming agent. In at least one embodiment, the anti-foaming agent comprises an emulsion such as, by way of example only, Antifoam H-10 Emulsion, manufactured by Dow Corning Corporation, although it is understood that anti-foaming agents exhibiting similar properties may be utilized.

In yet another embodiment of the temporary aqueous aerosol paint composition of the present invention, the aqueous paint component also comprises a surfactant. Similar to the dispersant described above, the surfactant may be included to enhance the stability of the aqueous paint component by "balancing" the various interactive forces between the different compounds. At least one embodiment of the present invention utilizes an alcohol based compound as the surfactant, such as, by way of example only, the ester alcohol compound Texanol as manufactured by the Eastman Chemical Company. The aqueous paint component of the inventive composition of the present invention may comprise the surfactant between generally about 0.1% to 1.0% by weight. More specifically, one preferred embodiment of the aqueous paint component of the present invention comprises generally about 0.85% by weight of the surfactant, while one other preferred embodiment comprises generally about 0.10% by weight of the surfactant.

The aqueous paint component of the present invention may also comprise a bactericide, to minimize spoilage of the aqueous paint component by the various bacterium to which it may be exposed. The aqueous paint component preferably comprises an aqueous based broad spectrum bactericide, and in one preferred embodiment, the bactericide comprises 1,3-dihydroxymethyl-5,5-dimethylhydantoin and 1-hydroxymethyl-5,5-dimethylhydantoin, such as, for example, Troysan 395, manufactured by Troy Chemical Company. A preferred embodiment of the aqueous paint component comprises the bactericide in an amount of generally about 0.03% by weight.

A further embodiment of the aqueous paint component of the present invention may comprise a light stabilizer. More in particular, the aqueous paint component comprises a light stabilizer in formulations also comprising one or more colored pigment compounds, to prevent premature degradation of the paint composition following application and cure. The type and amount of light stabilizer which the aqueous paint component comprises is important to achieve the desired "temporary" aspect of the inventive composition of the present invention. Specifically, utilization of the incorrect type and/or amount of the light stabilizer will result in a paint composition which either degrades too quickly or too slowly, following application and cure, via exposure to the ultraviolet rays of the sun.

The light stabilizer utilized in the present invention may comprise, in one preferred embodiment, a combination of polymeric benzotriazole compounds such as, by way of example only, Tinuvin 5151, manufactured by Ciba Specialty Chemicals Corporation U.S.A. As before, the aqueous paint component of the inventive composition of the present invention may comprise a light stabilizer in an amount of up to generally about 0.6% by weight. In one further embedment, the aqueous paint component comprises an amount of between generally about 0.20% and 0.25% by weight of the light stabilizer. In at least one embodiment, the inventive composition comprises no amount of a light stabilizer. As illustrated below in the exemplary formulations of Tables I through XV, the light stabilizer is included in the formulations comprising non-organic fluorescent pigment compounds.

In addition to the aqueous paint component, the temporary aqueous aerosol paint composition of the present invention also comprises an aqueous propellant component. The aqueous propellant component may comprise between generally about 10% to 40% by weight of the temporary aqueous aerosol paint composition. One preferred embodiment of the aqueous propellant component comprises an aqueous dimethyl ether compound and, in this preferred embodiment, the aqueous propellant component comprises generally about 25% by weight of the temporary aqueous aerosol paint composition. In at least one embodiment, the aqueous propellant component of the present invention comprises the aqueous dimethyl ether compound Dymel, manufactured by DuPont Fluoroproducts.

In one further embodiment, the aqueous propellant component comprises a blend of an aqueous dimethyl ether compound in an amount of between about 91 percent to 95 percent, and propane in an amount of between about 5 percent to about 9 percent. In one further embodiment, the aqueous propellant component comprises a blend of an aqueous dimethyl ether compound in an amount of about 93 percent and propane in an amount of about 7 percent. Tests performed with the foregoing aqueous propellant, i.e., 93 percent dimethyl ether and 7 percent propane, have shown a pressure of 60 psi in an aerosol spray can at temperatures of 40° F. In at least one embodiment, the temporary aqueous aerosol paint composition of the present invention comprises an amount of aqueous propellant of about 18% by weight percent and an amount of aqueous paint component of about 82% by weight.

The following tables, Tables I through VII, provide exemplary formulations of one preferred embodiment of the aqueous paint component of the composition of the present invention for several possible color variations. These exemplary formulations list generally the amount of each specific compound in each embodiment. The weight percentages indicated in the following tables are for illustrative purposes only, and are not intended to imply exact values for purposes of limiting the scope of the present invention, rather they are presented to illustrate the combinations and amounts of the aforementioned compounds which various embodiments of the aqueous paint component of the present invention may comprise.

TABLE I

FLUORESCENT PINK AQUEOUS PAINT COMPONENT

| Compound | Weight Percent |
|---|---|
| water | 72% |
| polyvinyl acetate dispersion | 6% |
| fluorescent pink pigment compound | 15% |
| aluminum silicate compound | 2% |
| calcium carbonate compound | 2% |
| dispersant | 0.5% |
| anti-foaming agent | 0.25% |
| surfactant | 0.8% |
| bactericide | 0.03% |
| light stabilizer | 0.6% |

TABLE II

FLUORESCENT RED AQUEOUS PAINT COMPONENT

| Compound | Weight Percent |
|---|---|
| water | 72% |
| polyvinyl acetate dispersion | 6% |
| fluorescent red pigment compound | 10% |
| organic red pigment compound | 5% |
| aluminum silicate compound | 2% |
| calcium carbonate compound | 2% |
| dispersant | 0.5% |
| anti-foaming agent | 0.25% |
| surfactant | 0.8% |
| bactericide | 0.03% |
| light stabilizer | 0.6% |

TABLE III

FLUORESCENT ORANGE AQUEOUS PAINT COMPONENT

| Compound | Weight Percent |
|---|---|
| water | 73% |
| polyvinyl acetate dispersion | 6% |
| fluorescent orange pigment compound | 14% |
| aluminum silicate compound | 2% |
| calcium carbonate compound | 2% |
| dispersant | 0.5% |
| anti-foaming agent | 0.25% |
| surfactant | 0.8% |
| bactericide | 0.03% |
| light stabilizer | 0.6% |

TABLE IV

FLUORESCENT GREEN AQUEOUS PAINT COMPONENT

| Compound | Weight Percent |
|---|---|
| water | 71% |
| polyvinyl acetate dispersion | 6% |
| fluorescent green pigment compound | 16% |
| aluminum silicate compound | 2% |
| calcium carbonate compound | 2% |
| dispersant | 0.5% |
| anti-foaming agent | 0.25% |
| surfactant | 0.8% |
| bactericide | 0.03% |
| light stabilizer | 0.6% |

TABLE V

FLUORESCENT BLUE AQUEOUS PAINT COMPONENT

| Compound | Weight Percent |
|---|---|
| water | 78% |
| polyvinyl acetate dispersion | 6% |
| fluorescent blue pigment compound | 9% |
| aluminum silicate compound | 2% |
| calcium carbonate compound | 2% |
| dispersant | 0.5% |
| anti-foaming agent | 0.25% |
| surfactant | 0.8% |
| bactericide | 0.03% |
| light stabilizer | 0.6% |

TABLE VI

FLUORESCENT YELLOW AQUEOUS PAINT COMPONENT

| Compound | Weight Percent |
|---|---|
| water | 70% |
| polyvinyl acetate dispersion | 6% |
| fluorescent yellow pigment compound | 17% |
| aluminum silicate compound | 2% |
| calcium carbonate compound | 2% |
| dispersant | 0.5% |
| anti-foaming agent | 0.25% |
| surfactant | 0.8% |
| bactericide | 0.03% |
| light stabilizer | 0.6% |

TABLE VII

| WHITE AQUEOUS PAINT COMPONENT | |
|---|---|
| Compound | Weight Percent |
| water | 63% |
| polyvinyl acetate dispersion | 6% |
| white pigment compound | 18% |
| aluminum silicate compound | 5% |
| calcium carbonate compound | 6% |
| dispersant | 0.25% |
| anti-foaming agent | 0.23% |
| surfactant | 0.1% |
| bactericide | 0.03% |

There are some instances where an increased degradation of a temporary aqueous aerosol paint composition would be beneficial. Additional embodiments of the aqueous paint component have been developed which facilitate enhanced degradation of the temporary aerosol paint composition. Specifically, in one embodiment of the aqueous paint component of the present invention, at least one pigment compound is structured of non-organic dyes, resulting in a non-fluorescent temporary aerosol paint composition. The absence of an organic dye in the aqueous paint component results in an increased rate of degradation of the temporary aerosol paint composition.

In another embodiment of the temporary aqueous aerosol paint composition, the aqueous paint component further comprises a reduced amount of a light stabilizer, and at least one embodiment eliminates a light stabilizer component altogether. The reduction in the amount of a light stabilizer in the aqueous paint component permits ultra-violet rays from the sun to more easily penetrate the temporary aqueous aerosol paint composition, thus increasing the rate of degradation of the same.

Additionally, in at least one other embodiment of the aqueous paint component of the present invention, an anti-sagging agent, or thickener, may be added to enhance the performance of the temporary aerosol paint composition in non-horizontal applications by reducing the running or dripping of the temporary aqueous marking paint as it dries or cures on a surface. In one embodiment, an anti-sagging agent or thickener comprises an aqueous polyamide. An example of an anti-sagging agent in accordance with the present formulation may comprise, but is not limited to, Disparlon® AQ-600, manufactured by Kusumoto Chemicals, Ltd. Another example of an anti-sagging agent or thickener which may be utilized in the present aqueous paint component is the rheology modifier Tafigel PUR 60, as manufactured by Ultra Additives, Inc. of Bloomfield, N.J. In at least one embodiment, the aqueous paint component comprises between generally about 2.90% to 3.25% by weight of an anti-sagging agent or thickener.

In at least one further embodiment, a complementary anti-sagging agent may be utilized in combination with the aforementioned "thickener". More in particular, in at least one embodiment, a complementary anti-sagging agent incorporated into the aqueous paint component of the present invention comprises hydrated magnesium silicate, or sepiolite clay, such as, but not limited to, Pangel S15000, as manufactured by Tolsa S.A. of Madrid, Spain. At least one embodiment of the aqueous paint component of the present invention comprises an amount of a complementary anti-sagging agent of between generally about 0.10% to 1.00% by weight. In at least one further embodiment, the complementary anti-sagging agent is present in combination with an amount of the aforementioned anti-sagging agent or thickener of between about 0.10% and 1.00% by weight.

The following tables, Tables VIII through XV, provide exemplary formulations of various embodiments of an aqueous paint component developed to facilitate enhanced degradation of a variety of exemplary color variations. The formulations in Tables VIII through XV further comprise an anti-sagging agent. These exemplary formulations list generally the amount of each specific compound in each embodiment. The weight percentages indicated in the following tables are for exemplary purposes only, and are not intended to imply exact values for purposes of limiting the scope of the inventive composition, rather they illustrative of the various combinations and amounts of the aforementioned compounds which various embodiments of the aqueous paint component of the present invention may comprise.

TABLE VIII

| FLUORESCENT PINK AQUEOUS PAINT COMPONENT | |
|---|---|
| Compound | Weight Percent |
| water | 74.14% |
| dispersant | 0.52% |
| fluorescent pink pigment compound | 12.51% |
| aluminum silicate compound | 1.70% |
| calcium carbonate compound | 2.10% |
| polyvinyl acetate dispersion | 4.27% |
| anti-foaming agent | 0.75% |
| bactericide | 0.03% |
| light stabilizer | 0.23% |
| surfactant | 0.85% |
| anti-sagging agent | 2.90% |

TABLE IX

| RED AQUEOUS PAINT COMPONENT | |
|---|---|
| Compound | Weight Percent |
| water | 83.13% |
| dispersant | 0.52% |
| red pigment compound | 4.65% |
| aluminum silicate compound | 1.70% |
| calcium carbonate compound | 2.07% |
| polyvinyl acetate dispersion | 2.95% |
| anti-foaming agent | 0.75% |
| bactericide | 0.03% |
| surfactant | 0.95% |
| anti-sagging agent | 3.25% |

TABLE X

| FLUORESCENT ORANGE AQUEOUS PAINT COMPONENT | |
|---|---|
| Compound | Weight Percent |
| water | 73.55% |
| dispersant | 0.52% |
| fluorescent orange pigment compound | 13.10% |
| aluminum silicate compound | 1.70% |
| calcium carbonate compound | 2.10% |
| polyvinyl acetate dispersion | 4.27% |
| anti-foaming agent | 0.75% |
| bactericide | 0.03% |
| light stabilizer | 0.23% |
| surfactant | 0.85% |
| anti-sagging agent | 2.90% |

TABLE XI

FLUORESCENT GREEN AQUEOUS PAINT COMPONENT

| Compound | Weight Percent |
| --- | --- |
| water | 73.03% |
| dispersant | 0.52% |
| fluorescent green pigment compound | 13.62% |
| aluminum silicate compound | 1.70% |
| calcium carbonate compound | 2.10% |
| polyvinyl acetate dispersion | 4.27% |
| anti-foaming agent | 0.75% |
| bactericide | 0.03% |
| light stabilizer | 0.23% |
| surfactant | 0.85% |
| anti-sagging agent | 2.90% |

TABLE XII

FLUORESCENT BLUE AQUEOUS PAINT COMPONENT

| Compound | Weight Percent |
| --- | --- |
| water | 75.52% |
| dispersant | 0.52% |
| fluorescent blue pigment compound | 11.13% |
| aluminum silicate compound | 1.70% |
| calcium carbonate compound | 2.10% |
| polyvinyl acetate dispersion | 4.27% |
| anti-foaming agent | 0.75% |
| bactericide | 0.03% |
| light stabilizer | 0.23% |
| surfactant | 0.85% |
| anti-sagging agent | 2.90% |

TABLE XIII

FLUORESCENT YELLOW AQUEOUS PAINT COMPONENT

| Compound | Weight Percent |
| --- | --- |
| water | 73.57% |
| dispersant | 0.52% |
| fluorescent yellow pigment compound | 13.08% |
| aluminum silicate compound | 1.70% |
| calcium carbonate compound | 2.10% |
| polyvinyl acetate dispersion | 4.27% |
| anti-foaming agent | 0.75% |
| bactericide | 0.03% |
| light stabilizer | 0.23% |
| surfactant | 0.85% |
| anti-sagging agent | 2.90% |

TABLE XIV

FLUORESCENT PURPLE AQUEOUS PAINT COMPONENT

| Compound | Weight Percent |
| --- | --- |
| water | 73.08% |
| dispersant | 0.52% |
| fluorescent purple pigment compound | 13.57% |
| aluminum silicate compound | 1.70% |
| calcium carbonate compound | 2.10% |
| polyvinyl acetate dispersion | 4.27% |
| anti-foaming agent | 0.75% |
| bactericide | 0.03% |
| light stabilizer | 0.23% |
| surfactant | 0.85% |
| anti-sagging agent | 2.90% |

TABLE XV

WHITE AQUEOUS PAINT COMPONENT

| Compound | Weight Percent |
| --- | --- |
| water | 64.80% |
| dispersant | 0.52% |
| white pigment compound | 23.10% |
| aluminum silicate compound | 1.70% |
| calcium carbonate compound | 2.10% |
| polyvinyl acetate dispersion | 3.27% |
| anti-foaming agent | 0.73% |
| bactericide | 0.03% |
| surfactant | 0.85% |
| anti-sagging agent | 2.90% |

One further embodiment of the aqueous paint component of the present invention comprises a slight amount of an anti-freeze agent, such as propylene glycol, in order to enhance the temperature stability of the aqueous aerosol paint component which has been added to a spray aerosol can for transport and storage, as well as sue, in sub-freezing temperatures. In at least one embodiment, the aqueous aerosol paint component comprises propylene glycol in an amount of generally less than about 0.50% by weight, and in at least one further embodiment, in an amount of less than about 0.10% by weight, for example, 0.09% by weight.

A neutralizing agent my be employed in at least one embodiment of the aqueous aerosol paint component in accordance with the present invention in order to maintain the pH of the final composition in an acceptable range to inhibit degradation of the aerosol can in which the composition is ultimately provided. In at least one embodiment, the neutralizing agent comprises an alkanolamine blend. More in particular, in at least one embodiment, the neutralizing agent comprises a propriety blend of alkanolamines as manufactured by Hercules Incorporated, Aqualon Division, and sold under the brand name of PHLEX™ 110 Neutralizing Agent. The aqueous paint component of the present invention comprises less than 0.50% by weight of the neutralizing agent, and in at least one embodiment, the aqueous aerosol paint component comprises a neutralizing agent in an amount of about 0.01% by weight.

In addition to a neutralizing agent to adjust the pH to an acceptable level to inhibit degradation of the aerosol can in which the aqueous aerosol paint component is ultimately provided, a rust inhibitor may be provided to inhibit the formation of rust on the inside of the aerosol can in the vapor space above the pressurized aqueous aerosol paint composition. In at least one embedment, the rust inhibitor comprises a cyclic organic compound having both amine and ether functional groups. In one further embodiment, the aqueous aerosol paint component of the present invention comprises an amount of the rust inhibitor morpholine, such as is manufactured by Huntsman International LLC of The Woodlands, Tex. More in particular, the aqueous aerosol paint component of the present invention may comprise less than about 0.50% by weight of a rust inhibitor. At least one embodiment, the aqueous aerosol paint component of the present invention comprises an amount of about 0.01% by weight of the rust inhibitor morpholine.

The following tables, Tables XVI through XXIII, provide exemplary formulations of various embodiments of an aqueous paint component developed to facilitate enhanced degradation of a variety of exemplary color variations. The formulations in Tables XVI through XXIII further comprise a complementary anti-sagging agent, an anti-freeze agent, a neutralizing agent, and a rust inhibitor. These exemplary formulations list generally the amount of each specific compound in each embodiment. The weight percentages indicated in the following tables are for exemplary purposes only, and are not intended to imply exact values for purposes of limiting the scope of the inventive composition, rather they illustrative of the various combinations and amounts of the aforementioned compounds which various embodiments of the aqueous paint component of the present invention may comprise.

TABLE XVI

FLUORESCENT PINK AQUEOUS PAINT COMPONENT

| Compound | Weight Percent |
|---|---|
| water | 71.56% |
| dispersant | 0.52% |
| fluorescent pink pigment compound | 15.95% |
| aluminum silicate compound | 2.45% |
| calcium carbonate compound | 2.95% |
| polyvinyl acetate dispersion | 4.65% |
| anti-foaming agent | 0.75% |
| bactericide | 0.03% |
| light stabilizer | 0.20% |
| surfactant | 0.49% |
| anti-sagging agent | 0.14% |
| anti-freeze agent | 0.09% |
| neutralizing agent | 0.01% |
| rust inhibitor | 0.01% |
| complementary anti-sagging agent | 0.20% |

TABLE XVII

RED AQUEOUS PAINT COMPONENT

| Compound | Weight Percent |
|---|---|
| water | 86.85% |
| dispersant | 0.52% |
| red pigment compound | 3.85% |
| aluminum silicate compound | 2.45% |
| calcium carbonate compound | 2.95% |
| polyvinyl acetate dispersion | 0.75% |
| anti-foaming agent | 0.75% |
| bactericide | 0.03% |
| surfactant | 0.49% |
| anti-sagging agent | 0.30% |
| anti-freeze agent | 0.09% |
| neutralizing agent | 0.01% |
| rust inhibitor | 0.01% |
| complementary anti-sagging agent | 0.95% |

TABLE XVIII

FLUORESCENT ORANGE AQUEOUS PAINT COMPONENT

| Compound | Weight Percent |
|---|---|
| water | 71.69% |
| dispersant | 0.52% |
| fluorescent orange pigment compound | 15.95% |
| aluminum silicate compound | 2.45% |
| calcium carbonate compound | 2.95% |
| polyvinyl acetate dispersion | 4.50% |
| anti-foaming agent | 0.75% |
| bactericide | 0.03% |
| light stabilizer | 0.20% |
| surfactant | 0.49% |
| anti-sagging agent | 0.14% |
| anti-freeze agent | 0.09% |
| neutralizing agent | 0.01% |
| rust inhibitor | 0.01% |
| complementary anti-sagging agent | 0.22% |

TABLE XIX

FLUORESCENT GREEN AQUEOUS PAINT COMPONENT

| Compound | Weight Percent |
|---|---|
| water | 71.66% |
| dispersant | 0.52% |
| fluorescent green pigment compound | 15.90% |
| aluminum silicate compound | 2.45% |
| calcium carbonate compound | 2.95% |
| polyvinyl acetate dispersion | 4.65% |
| anti-foaming agent | 0.75% |
| bactericide | 0.03% |
| light stabilizer | 0.15% |
| surfactant | 0.49% |
| anti-sagging agent | 0.14% |
| anti-freeze agent | 0.09% |
| neutralizing agent | 0.01% |
| rust inhibitor | 0.01% |
| complementary anti-sagging agent | 0.20% |

TABLE XX

FLUORESCENT BLUE AQUEOUS PAINT COMPONENT

| Compound | Weight Percent |
|---|---|
| water | 72.03% |
| dispersant | 0.52% |
| fluorescent blue pigment compound | 15.95 |
| aluminum silicate compound | 2.45% |
| calcium carbonate compound | 2.95% |
| polyvinyl acetate dispersion | 4.25% |
| anti-foaming agent | 0.75% |
| bactericide | 0.03% |
| light stabilizer | 0.13% |
| surfactant | 0.49% |
| anti-sagging agent | 0.14% |
| anti-freeze agent | 0.09% |
| neutralizing agent | 0.01% |
| rust inhibitor | 0.01% |
| complementary anti-sagging agent | 0.20% |

TABLE XXI

FLUORESCENT YELLOW AQUEOUS PAINT COMPONENT

| Compound | Weight Percent |
|---|---|
| water | 72.29% |
| dispersant | 0.52% |
| fluorescent yellow pigment compound | 15.25% |
| aluminum silicate compound | 2.45% |
| calcium carbonate compound | 2.95% |
| polyvinyl acetate dispersion | 4.60% |
| anti-foaming agent | 0.75% |
| bactericide | 0.03% |
| light stabilizer | 0.22% |
| surfactant | 0.49% |
| anti-sagging agent | 0.14% |
| anti-freeze agent | 0.09% |
| neutralizing agent | 0.01% |
| rust inhibitor | 0.01% |
| complementary anti-sagging agent | 0.20% |

TABLE XXII

FLUORESCENT PURPLE AQUEOUS PAINT COMPONENT

| Compound | Weight Percent |
|---|---|
| water | 71.61% |
| dispersant | 0.52% |
| fluorescent purple pigment compound | 15.90% |

TABLE XXII-continued

FLUORESCENT PURPLE AQUEOUS PAINT COMPONENT

| Compound | Weight Percent |
|---|---|
| aluminum silicate compound | 2.45% |
| calcium carbonate compound | 2.95% |
| polyvinyl acetate dispersion | 4.65% |
| anti-foaming agent | 0.75% |
| bactericide | 0.03% |
| light stabilizer | 0.20% |
| surfactant | 0.49% |
| anti-sagging agent | 0.14% |
| anti-freeze agent | 0.09% |
| neutralizing agent | 0.01% |
| rust inhibitor | 0.01% |
| complementary anti-sagging agent | 0.20% |

TABLE XXIII

WHITE AQUEOUS PAINT COMPONENT

| Compound | Weight Percent |
|---|---|
| water | 75.54% |
| dispersant | 0.52% |
| white pigment compound | 14.90% |
| aluminum silicate compound | 2.45% |
| calcium carbonate compound | 2.95% |
| polyvinyl acetate dispersion | 1.25% |
| anti-foaming agent | 0.73% |
| bactericide | 0.03% |
| surfactant | 0.49% |
| anti-sagging agent | 0.18% |
| anti-freeze agent | 0.09% |
| neutralizing agent | 0.01% |
| rust inhibitor | 0.01% |
| complementary anti-sagging agent | 0.85% |

The present invention also comprises a method for preparing a temporary aqueous aerosol paint composition, such as the composition described above. More in particular, the present invention encompasses a method for preparing an aqueous paint component of a temporary aqueous aerosol paint composition, as described above.

The method of the present invention comprises charging a reaction vessel with an initial amount of an aqueous solvent. The reaction vessel may comprise any number of configurations with respect to volume and geometry, provided that the reaction vessel includes means for thoroughly mixing the contents of the reaction vessel, i.e., the compounds comprising the aqueous paint component, at each predetermined mixing speed indicated below. In addition, the reaction vessel includes means for controlling the temperature of the contents of the reaction vessel as required, also as indicated below. As will be appreciated, the actual quantity of the temporary aqueous aerosol paint composition which may be prepared utilizing the present inventive method may be easily adjusted by modifying the amounts of the various compounds relative to the final amount desired, and providing a reaction vessel suited to thorough mixing and temperature control of this actual quantity.

In the method of the present invention, the aqueous solvent may comprise an amount of water, and in one preferred embodiment, an amount of filtered water. As described above, the amount of filtered water may be filtered to remove chlorine, and/or iron and/or ions thereof. Charging the reaction vessel with the initial amount of aqueous solvent comprises adding an amount of aqueous solvent to the reaction vessel which is generally about 20% by weight of a total amount of aqueous solvent to be added.

The method of the present invention further comprises setting a primary mixing cycle for the contents of the reaction vessel. Specifically, setting the primary mixing cycle comprises adjusting a mixing speed for the contents of the reaction vessel to approximately 1,800 revolutions per minute (rpm), and maintaining the mixing speed at approximately 1,800 rpm for generally about 10 to 15 minutes.

Additionally, the method of the present invention also comprises adding at least one pigment compound to the reaction vessel. The at least one pigment compound may comprise, for example, any of the pigment compounds described above, and in an amount of between generally about 5% to 25% by weight of the aqueous paint component. One embodiment of the present method comprises adding the at least one pigment compound to the reaction vessel during the primary mixing cycle, preferably, just after setting the primary mixing cycle. In addition, the at least one pigment compound is preferably added slowly, thereby allowing the at least one pigment compound to mix thoroughly with the aqueous solvent. At least one embodiment of the present method further comprises adding a plurality of pigment compounds to the reaction vessel, the plurality of pigment compounds being of the type and generally in the amounts indicated above for pigment compounds.

The method of the present invention also comprises adding an additional amount of the aqueous solvent to the reaction vessel. In one preferred embodiment, the method comprises adding an additional amount of the aqueous solvent wherein the additional amount is generally about 10% by weight of the total amount of aqueous solvent to be added.

In addition, the method for preparing an aqueous paint component of a temporary aqueous aerosol paint composition further comprises adding a dispersant to the reaction vessel. In one preferred embodiment, the dispersant comprises a non-ionic surfactant as described above, and in an amount of between generally about 0.10% to 1.00% by weight of the aqueous paint component in the reaction vessel.

The method of the present invention further comprises setting a high velocity mixing cycle for the contents of the reaction vessel. More in particular, setting the high velocity mixing cycle comprises adjusting a mixing speed for the contents of the reaction vessel to approximately 2,300 rpm, and maintaining the mixing speed at approximately 2,300 rpm for generally about 60 minutes. In addition, the method comprises controlling a temperature of the contents of the reaction vessel at approximately, but not exceeding, thirty degrees Celsius (30° C.), during at least the high velocity mixing cycle.

One embodiment of the present method comprises adding at least one filler compound to the reaction vessel. The at least one filler compound may be added in accordance with the amount previously described, being between generally about 1% to 10% by weight of the aqueous paint component. Further, adding the at least one filler compound to the reaction vessel may comprise adding one of the filler compounds disclosed above, specifically, an aluminum silicate compound or a calcium carbonate compound.

In one preferred embodiment, the method of the present invention comprises adding a plurality of filler compounds to the reaction vessel, each comprising between generally about 1% to 10% by weight of the aqueous paint component. Specifically, one preferred embodiment of the present method comprises adding an aluminum silicate compound and a calcium carbonate compound, each in an amount of generally about 2% by weight of the aqueous paint component. In one other preferred embodiment, the present method comprises adding an aluminum silicate compound in an amount of generally about 5% by weight of the aqueous paint component and a calcium carbonate compound in an amount of generally about 6% by weight.

The method of the present invention further comprises setting a first low velocity mixing cycle for the contents of the reaction vessel. More in particular, setting the first low velocity mixing cycle comprises adjusting a mixing speed for the contents of the reaction vessel to approximately 800 rpm, and maintaining the mixing speed at approximately 800 rpm for generally about 5 to 10 minutes. In one preferred embodiment, the present method further comprises adding an anti-foaming agent to the reaction vessel in an amount of between generally about 0.10% and 0.50% by weight of the aqueous paint component. One further preferred embodiment comprises adding an amount of a surfactant to the reaction vessel in an amount of between generally about 0.05% to 1.00% by weight of the aqueous paint component. In at least one embodiment of the present method, the anti-foaming agent may comprise an emulsion, and the surfactant may comprise an alcohol based compound, as disclosed above. Preferably, the anti-foaming agent and the surfactant are added to the reaction vessel as the mixing speed is being reduced from the high velocity mixing speed to the first low velocity mixing speed.

At least one embodiment of the present method for preparing an aqueous paint component of a temporary aqueous aerosol paint composition comprises adding a bactericide to the reaction vessel. In at least one embodiment, the bactericide comprises an aqueous based broad spectrum bactericide as described above, in an amount of between generally about 0.10% to 1.00% by weight of the aqueous paint component in the reaction vessel. In one preferred embodiment, adding the bactericide comprises adding the bactericide in an amount of generally about 0.03% by weight of the aqueous paint component.

The method of the present invention may also comprise adding an amount of a light stabilizer to the reaction vessel. The light stabilizer may comprise a polymeric benzotriazole, as indicated above. One preferred embodiment of the method of the present invention comprises adding the light stabilizer in an amount of up to generally about 0.6% by weight of the aqueous paint component. In one embodiment, the method comprises adding the light stabilizer in an amount in the range of generally about 0.20% to 0.25% by weight of the aqueous paint component. In yet one further embodiment, the method does not include adding any amount of a light stabilizer.

The present method for preparing an aqueous paint component of a temporary aqueous aerosol paint composition further comprises adding a polymeric resin to the reaction vessel, the polymeric resin comprising between generally about 5% to 10% by weight of the aqueous paint component. One preferred embodiment of the present invention comprises adding the polymeric resin to the reaction vessel in an amount of generally about 6% by weight of the aqueous paint component. In addition, in a preferred embodiment, the polymeric resin comprises an aqueous polymeric compound dispersion and, more specifically, a polyvinyl acetate dispersion, as previously disclosed.

The method of the present invention further comprises setting a second low velocity mixing cycle for the contents of the reaction vessel. More in particular, setting the first low velocity mixing cycle comprises adjusting a mixing speed for the contents of the reaction vessel to approximately 600 rpm, and maintaining the mixing speed at approximately 600 rpm for generally about 10 to 15 minutes.

Additionally, the method of the present invention comprises adding a final amount of aqueous solvent to the reaction vessel, the final amount of aqueous solvent comprising generally about 70% by weight of the total amount of aqueous solvent added to the reaction vessel.

An alternate method for preparing a temporary aqueous aerosol paint composition, specifically, an alternate method for preparing an aqueous paint component formulated for enhanced degradation of a temporary aqueous aerosol paint composition, is as follows.

The alternate method begins with charging the reaction vessel with an initial amount of an aqueous solvent. As above, the reaction vessel may comprise any configuration and/or shape which allows thorough mixing of the contents contained therein. It is further understood that the reaction vessel is of such a size that permits the desired quantity of temporary aqueous aerosol paint composition to be prepared therein. The reaction vessel is also equipped with means to control the mixing speed, in order to facilitate the alternate method of the present invention described herein.

As before, the aqueous solvent utilized in the alternate method of the present invention may comprise an amount of water, and in one embodiment, an amount of filtered water. Charging the reaction vessel with an initial amount of aqueous solvent comprises adding an amount of aqueous solvent to the reaction chamber which is generally about 75% by weight of a total amount of aqueous solvent to be added.

The present method also comprises adding an amount of dispersant to the reaction vessel. In one embodiment, the dispersant comprises a non-ionic surfactant as described above, in an amount between generally about 0.10% to 1.00% by weight of aqueous paint component.

The present method further comprises setting a primary mixing cycle for the contents of the reaction vessel. Specifically, setting the primary mixing cycle comprises adjusting the mixing speed of the contents of the reaction vessel to 2,400 revolutions per minute (rpm), and maintaining the mixing speed at approximately 2,400 rpm for about 10 minutes.

Additionally, the present method comprises adding at least one pigment compound to the reaction vessel. The at least one pigment compound may comprise any of the pigment compounds described above. In one embodiment, the at least one pigment compound comprises between generally about 4% to 25% by weight of the aqueous paint component. One embodiment of the alternate method comprises adding the at least one pigment compound to the reaction vessel during the mixing cycle, just after setting the primary mixing cycle. Further, in at least one embodiment, the at least one pigment compound is added slowly to the reaction vessel to allow for thorough mixing.

The present method also comprises adding at least one filler compound to the reaction vessel during the primary mixing cycle. The at least one filler compound may be added in an amount between generally about 1% to 10% by weight of the aqueous paint component. Specifically, the at least one filler compound may comprise an aluminum silicate compound or a calcium carbonate compound, as described above. In one embodiment, a plurality of filler compounds are added to the reaction vessel. Specifically, in one embodiment, an amount aluminum silicate compound and an amount of calcium carbonate compound, each in an amount approximating 2% by weight of aqueous paint component, is added to the reaction vessel.

In addition, the present method also comprises adding an amount of anti-foaming agent to the reaction vessel during the primary mixing cycle. In one embodiment, the anti-foaming agent comprises an amount between generally about 0.1% to 1.0% by weight of aqueous paint component.

In at least one embodiment, an amount of bactericide is also added to the reaction vessel during the primary mixing cycle. The bactericide may be an aqueous broad-based bactericide, as described above, in an amount between generally about 0.01% to 0.10% by weight of the aqueous paint component. In one embodiment, the bactericide comprises approximately 0.03% by weight of the aqueous paint component.

The present method may also comprise adding an amount of light stabilizer to the reaction vessel during the primary mixing cycle. The light stabilizer may comprise a polymeric benzotriazole, as described above. One embodiment of the alternate method of the present invention comprises adding the light stabilizer in an amount generally about 0.23% by weight of the aqueous paint component. In at least one embodiment, however, no light stabilizer is added to the reaction vessel, to facilitate enhanced degradation of the "temporary" aqueous aerosol paint composition.

The present method comprises adding an amount of surfactant to the reaction vessel during the primary mixing cycle. The surfactant may be an alcohol based compound, as described above.

In one embodiment, the surfactant comprises generally between 0.05% to 1% of the aqueous paint component. The present method further comprises setting a secondary mixing cycle for the contents of the reaction vessel. Specifically, setting the secondary mixing cycle comprises adjusting the mixing speed of the contents of the reaction vessel to 600 revolutions per minute (rpm), and maintaining the mixing speed at approximately 600 rpm for about 2 minutes.

The present method also comprises adding an amount of polymeric resin to the reaction vessel during the secondary mixing cycle, the polymeric resin comprising between generally about 3% to 10% by weight of the aqueous paint component. In one embodiment of the present invention, the polymeric resin comprises an aqueous polymeric compound dispersion, and more specifically, a polyvinyl acetate dispersion, as disclosed above. In one embodiment, the polymeric resin is added slowly to the reaction vessel while mixing.

The present method further comprises adding an amount of anti-sagging agent to the reaction vessel during the secondary mixing cycle. In one embodiment, the anti-sagging agent comprises between generally about 2.90% to 3.25% by weight of the aqueous paint component. In one embodiment, the anti-sagging agent is added slowly to the reaction vessel while mixing.

Additionally, the alternate method of the present invention comprises adding a final amount of aqueous solvent to the reaction vessel, the final amount of aqueous solvent comprising generally about 25% by weight of the total amount of aqueous solvent added to the reaction vessel.

The present invention further comprises a method for charging an aerosol can with a temporary aqueous paint composition, such as disclosed above, thereby permitting a ready means for applying the inventive composition as required. One preferred embodiment comprises charging an aerosol can specifically designed for inverted application of the aqueous aerosol paint composition of the present invention.

Specifically, the method comprises charging the aerosol can with an amount of an aqueous paint component, such as may be prepared via the method disclosed herein. In one preferred embodiment, the method comprises charging the aerosol can with an amount of the aqueous paint component comprising generally about 75% by weight of the aqueous aerosol paint composition. The method may further comprise installing a valve on the can to permit controlled application of the contents therefrom. Also, the present method comprises charging the aerosol can with an amount of an aqueous propellant. In a preferred embodiment, the method includes charging the aerosol can with an aqueous dimethyl ether compound in an amount of generally about 25% by weight of the aqueous paint composition, such as the inventive temporary aqueous aerosol paint composition disclosed herein.

Since many modifications, variations and changes in detail can be made to the described preferred embodiment of the invention, it is intended that all matters in the foregoing description be interpreted as illustrative and not in a limiting sense. Thus, the scope of the invention should be determined by the appended claims and their legal equivalents.

Now that the invention has been described,

What is claimed is:

1. A temporary aqueous aerosol paint composition comprising:
   an aqueous paint component formulated to substantially degrade within four weeks or less of application onto a surface, said aqueous paint component comprising between about 70% to 90% by weight of said composition, said aqueous paint component further comprising:
      an aqueous solvent comprising between about 70% to 90% by weight and comprises an amount of water,
      a dispersant comprising between about 0.1% to 1.0% by weight,
      at least one pigment compound comprising between about 3% to 20% by weight,
      at least one filler compound comprising between about 1% to 5% by weight,
      an anti-foaming agent comprising between about 0.1% to 1.0% by weight,
      a bactericide comprising between about 0.01% to 0.10% by weight,
      a surfactant comprising between about 0.1% to 1.0% by weight,
      an aqueous dispersion of a polyvinyl acetate homopolymer comprising between about 0.5% to 10% by weight,
      an anti-sagging agent comprising between about 0.10% to 1.00% by weight,
      a complementary anti-sagging agent comprising between about 0.10% to 1.00% by weight,
      an anti-freeze agent comprising between about 0.01% to 0.50% by weight,
      a neutralizing agent comprising between about 0.01% to 0.50% by weight, and
      a rust inhibitor comprising between about 0.01% to 0.50% by weight,
   and
   an aqueous propellant component comprising between about 10% to 30% by weight of said composition.

2. The composition as recited in claim 1 wherein said aqueous paint component further comprises a light stabilizer in an amount of between about 0.1% to 0.5% by weight of said aqueous paint component.

3. The composition as recited in claim 2 wherein said light stabilizer comprises a polymeric benzotriazole.

4. The composition as recited in claim 1 wherein said aqueous propellant component comprises an aqueous dimethyl ether compound.

5. The composition as recited in claim 1 wherein said aqueous propellant component comprises a blend of an aqueous dimethyl ether compound and propane.

6. The composition as recited in claim 5 wherein said blend comprises said aqueous dimethyl ether compound in an amount of between about 91% and 95%.

7. The composition as recited in claim 6 wherein said blend comprises said propane in an amount of between about 5% and 9%.

8. The composition as recited in claim 5 wherein said blend comprises said aqueous dimethyl ether compound in an amount of about 93% and said propane in an amount of about 7%.

9. The composition as recited in claim 1 wherein said at least one pigment compound comprises a non-organic pigment compound.

10. A temporary aqueous aerosol paint composition comprising:
    an aqueous paint component comprising:
        an amount of water comprising between about 70% to 90% by weight,
        a polyvinyl acetate homopolymer dispersion comprising between about 0.5% to 5.0% by weight,
        at least one pigment compound comprising between about 3% to 18% by weight,
        an aluminum silicate compound comprising between about 2% to 3% by weight,
        a calcium carbonate compound comprising between about 2% to 3% by weight,
        a light stabilizer comprising about 0.75% by weight,
        a dispersant comprising about 0.5% by weight,
        a surfactant comprising about 0.5% by weight,
        a bactericide comprising about 0.03% by weight,
        an anti-sagging agent comprising between about 1% to 2% by weight,
        a complementary anti-sagging agent comprising between about 0.20% and 1.00% by weight,
        an anti-freeze agent comprising about 0.09% by weight,
        a neutralizing agent comprising about 0.01% by weight, and
        a rust inhibitor comprising about 0.01% by weight, and
    an aqueous propellant component comprising a blend of an aqueous dimethyl ether compound and propane,
    said aqueous paint component comprising about 80% by weight of said composition, and
    said aqueous propellant component comprising about 20% by weight of said composition.

11. The composition as recited in claim 10 wherein said blend comprises said aqueous dimethyl ether compound in an amount of about 93% and said propane in an amount of about 7%.

* * * * *